(12) United States Patent
Zimek et al.

(10) Patent No.: US 8,364,989 B2
(45) Date of Patent: Jan. 29, 2013

(54) POWER SUPPLY INPUT SELECTION CIRCUIT

(75) Inventors: Bernd Zimek, Graz (AT); Josef Haid, Graz (AT); Thomas Leutgeb, Lieboch (AT); Thomas Baglin, Graz (AT); Walter Kargl, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1314 days.

(21) Appl. No.: 11/861,843

(22) Filed: Sep. 26, 2007

(65) Prior Publication Data

US 2009/0083556 A1    Mar. 26, 2009

(51) Int. Cl.
G06F 1/00 (2006.01)
G06F 9/00 (2006.01)
G06F 9/24 (2006.01)
G06F 15/177 (2006.01)

(52) U.S. Cl. ............................. 713/310; 713/1; 713/300

(58) Field of Classification Search .................. 713/300, 713/310, 340, 1
See application file for complete search history.

(56) References Cited

U.S. PATENT DOCUMENTS

| | | | |
|---|---|---|---|
| 6,439,464 B1* | 8/2002 | Fruhauf et al. | 235/492 |
| 6,651,178 B1* | 11/2003 | Voegeli et al. | 713/300 |
| 6,883,715 B1* | 4/2005 | Fruhauf et al. | 235/492 |
| 6,970,032 B1* | 11/2005 | Smith et al. | 327/407 |
| 2005/0038924 A1* | 2/2005 | Takahashi | 710/5 |
| 2006/0257135 A1* | 11/2006 | Kawada | 396/301 |
| 2007/0175994 A1* | 8/2007 | Fruhauf | 235/440 |
| 2007/0288778 A1* | 12/2007 | Zhuang et al. | 713/320 |
| 2008/0054721 A1* | 3/2008 | Frew et al. | 307/52 |

* cited by examiner

*Primary Examiner* — Kim Huynh
*Assistant Examiner* — Brandon Kinsey
(74) *Attorney, Agent, or Firm* — Dickstein Shapiro LLP

(57) ABSTRACT

A power supply input selection circuit for selecting one of a plurality of power supply inputs to supply power to a driven circuit. The power supply input selection circuit includes a power supply input switching circuit configured to provide operating power to the driven circuit by routing a selected one of the power supply inputs to the driven circuit as a function of power supply selection information; and a logic circuit configured to change the power supply selection information if a default power mode does not match a desired power mode, the logic circuit being further configured to reset the power supply input selection circuit after changing the power supply selection information, the power supply selection information being maintained during the reset, in which the power supply input switching circuit selects a desired one of the power supply inputs after the logic circuit resets the power supply input selection circuit.

21 Claims, 5 Drawing Sheets

POWER SUPPLY INPUT SELECTION CIRCUIT

BACKGROUND OF THE INVENTION

Many modern electronic devices that have an integrated circuit include multiple power supply inputs, which may include a contact-based power supply input (e.g., for a battery, power cord or the like) and/or a contactless power supply input (e.g., for an inductive power supply). A power supply input selection circuit determines which of the multiple power supply inputs to use to power the driven circuit at any given time.

During power-up, the power supply input selection circuit, which may be under software and/or hardware control, determines which of the power supply inputs is the default power supply input. The power supply input selection circuit then powers up the driven circuit using this default power supply input. If there is a preferred or desired power supply input other than the default power supply input, the power supply input selection circuit immediately switches from the default power supply input to the preferred power supply input.

SUMMARY OF THE INVENTION

A power supply input selection circuit for selecting one of a plurality of power supply inputs to supply power to a driven circuit is provided. The power supply input selection circuit includes a power supply input switching circuit configured to provide operating power to the driven circuit by routing a selected one of the power supply inputs to the driven circuit as a function of power supply selection information; and a logic circuit configured to change the power supply selection information if a default power mode does not match a desired power mode, the logic circuit being further configured to reset the power supply input selection circuit after changing the power supply selection information, the power supply selection information being maintained during the reset, in which the power supply input switching circuit selects a desired one of the power supply inputs after the logic circuit resets the power supply input selection circuit.

DETAILED DESCRIPTION OF THE EMBODIMENTS

Figure 1A:
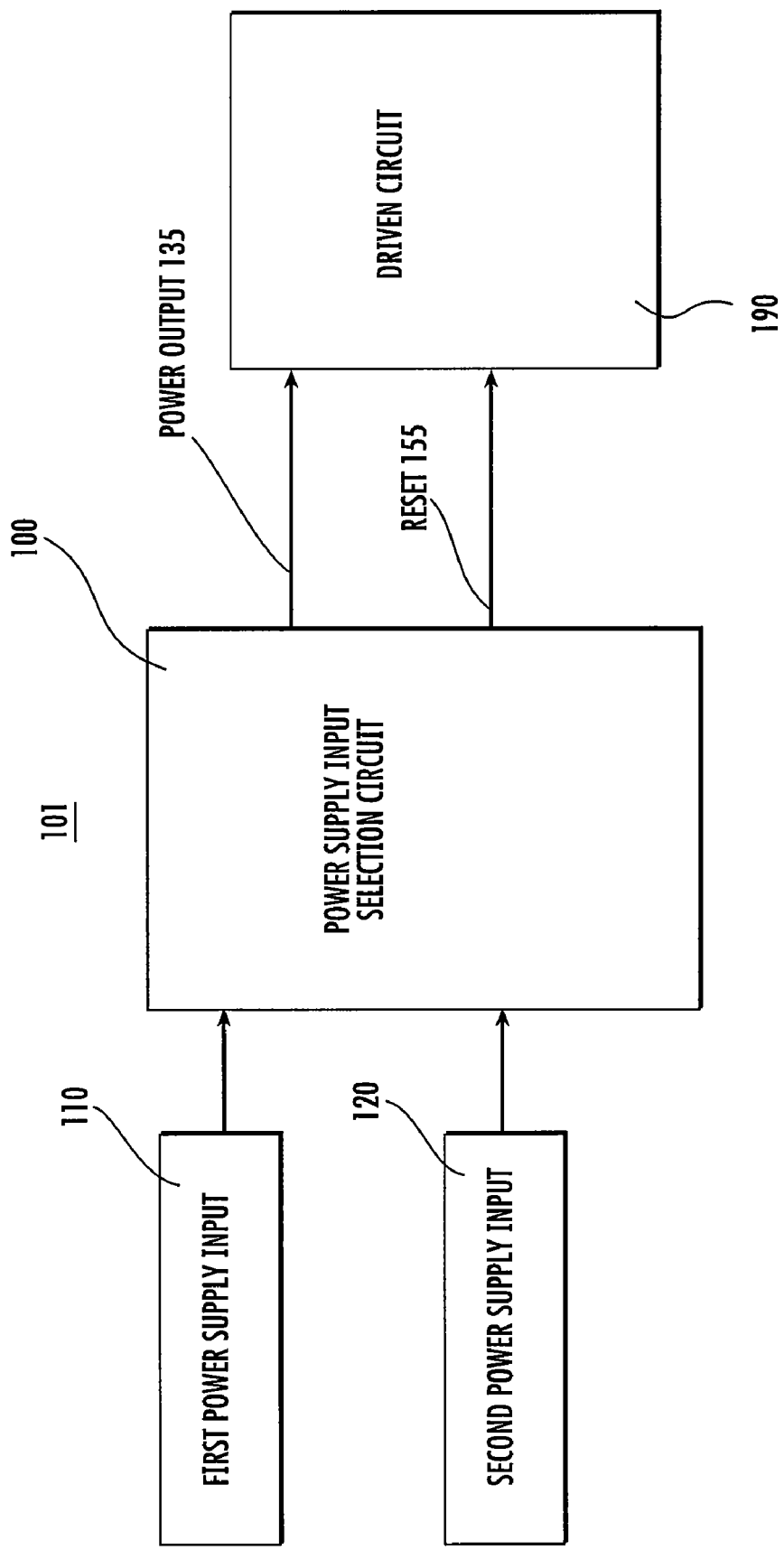
FIG. 1a is a block diagram of a system circuit according to an embodiment of the present invention.

Referring now to FIG. 1a, there is seen a block diagram of a system circuit 101 according to an embodiment of the present invention. System circuit 101 includes first and second power supply inputs 110, 120, a power supply input selection circuit 100 coupled to first and second power supply inputs 110, 120, and one or more driven circuits 190 coupled to power supply input selection circuit 100. Driven circuit 190 may include, for example, any conventional circuit that receives operating power, such as an integrated circuit, ASIC, analog circuit, digital circuit, etc.

Either or both of first and second power supply inputs 110, 120 may comprise any form of power supply, such as, for example, a contactless power supply input (e.g., an inductive power supply) or a contact-type power supply (e.g., a battery, wall outlet, power cell, etc.). With respect to one exemplary embodiment of the present invention, power supply input 110 comprises a contactless power supply and power supply input 120 comprises a contact-type power supply. It should also be appreciated that, although FIG. 1a shows two power supply inputs 110, 120, system circuit 101 may include any number of power supply inputs coupled to power supply input selection circuit 100.

During startup of system circuit 101, power supply input selection circuit 100 initiates a startup procedure, during which driven circuit 190 is not provided power. Once the startup procedure is completed, power supply input selection circuit 100 operates generally to route one of first and second power supply inputs 110, 120 to power output 135 in accordance with power supply selection information stored within power supply input selection circuit 100. The power supply selection information may be stored in hardware, software, or a combination of hardware and software. In one exemplary embodiment of the present invention, the power supply selection information is stored in a non-volatile latch and identifies a power supply input 110, 120 corresponding to a default and/or a desired power mode.

If the power supply input selection circuit 100 determines that a change in power supply inputs 110, 120 is necessary or desirable, or if the default power mode does not match a desired power mode, another one of power supply inputs 110, 120 is selected for powering driven circuit 190. For this purpose, the power supply selection information is replaced with new information identifying a different power supply input, for example, a power supply input (i.e., either of power supply inputs 110, 120) corresponding to a desired power mode. Power supply input selection circuit 100 is then restarted, while maintaining the new power supply selection information, to route the desired power supply input to driven circuit 190 via power output 135. During the restart, power supply input selection circuit 100 resets driven circuit 190 via reset line 155 and does not provide power thereto until power supply input selection circuit 100 completes the startup procedure. Once the startup procedure is completed, power supply input selection circuit 100 releases reset line 155 and routes the desired one of power supply inputs 110, 120 to power output 135. Driven circuit 190 then operates normally using the desired power supply input 110 or 120.

By resetting driven circuit 190 and not providing driven circuit 190 with power while power supply input selection circuit 100 is restarted, driven circuit 190 is advantageously not operational while switching between power supply inputs 110, 120. This permits various embodiments of the present invention to avoid potentially harmful voltage spikes on power output 135, which may result in data loss or damage to driven circuit 190.

Figure 1B:
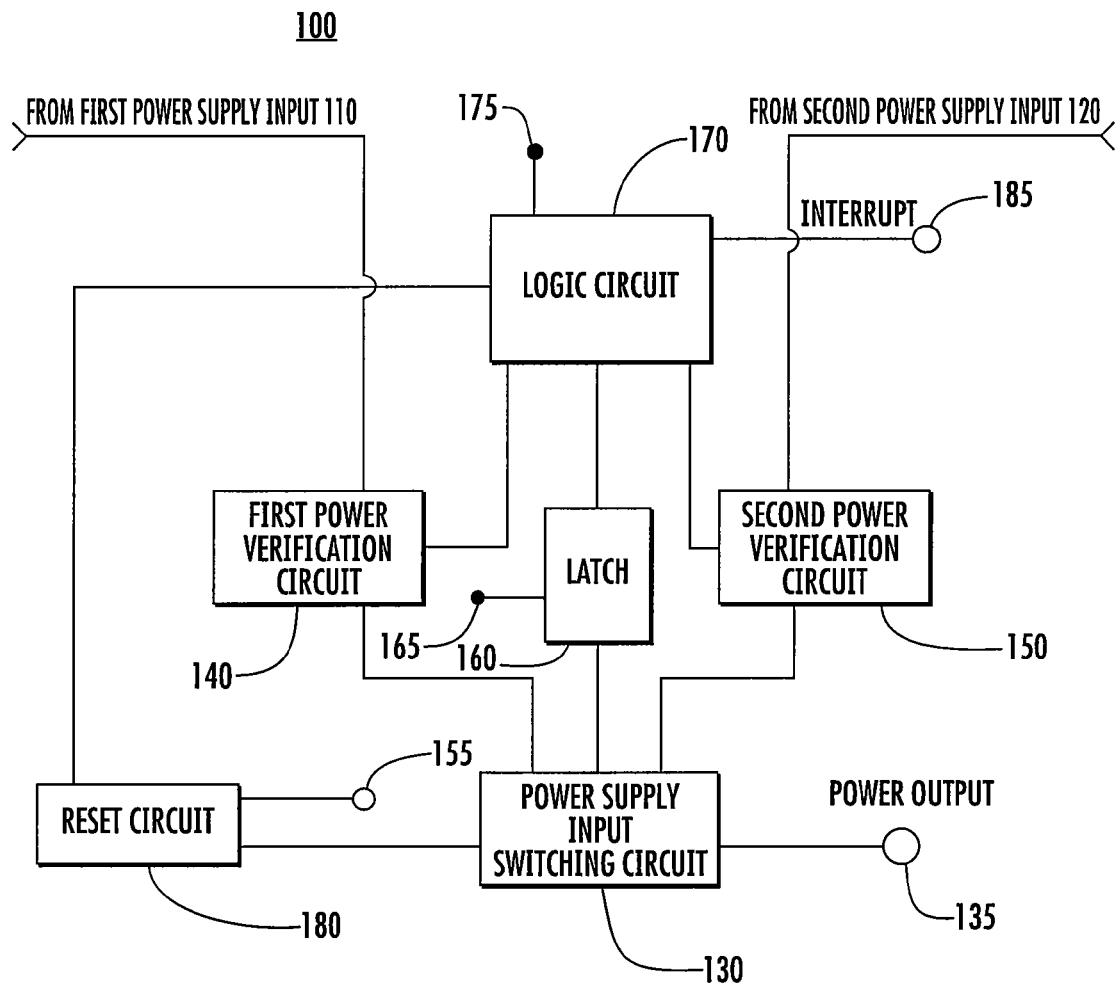
FIG. 1b is a block diagram of a power supply input selection circuit according to an embodiment of the present invention.

Referring now to FIG. 1b, there is seen a block diagram of a power supply input selection circuit 100 according to an embodiment of the present invention. Power supply input selection circuit 100 includes first and second power verification circuits 140, 150 respectively coupled to first and second power supply inputs 110, 120, a power supply selection switch 130 coupled to first and second power verification circuits 140, 150, a latch 160 coupled to the power supply input switching circuit 130, a reset circuit 180 coupled to power supply input switching circuit 130, a logic circuit 170 coupled to reset circuit 180 and to latch 160, and a power output 135 coupled to power supply input switching circuit 130 for supplying power to driven circuit 190.

Power supply input switching circuit 130 is operable to route one of first and second power supply inputs 110, 120 to power output 135 as a function of power supply selection information stored in latch 160, which may comprise, e.g., a register, buffer, non-volatile memory, or the like. The power supply selection information identifies a power supply input 110, 120 and can be written into latch 160 by logic circuit 170 or, alternatively, by external equipment via external input 165. In one variant of the present embodiment, the power selection information is written into latch 160 in accordance with a default power mode and/or a desired power mode.

Each of power verification circuits 140, 150 is operable to provide a power verification signal to logic circuit 170 in accordance with whether the power supply input 110, 120 with which it is associated is available for use. For this purpose, power verification circuits 140, 150 analyze one or more parameters of their associated power supply inputs 110, 120, such as stored charge, available current, supply voltage, and/or the like, to determine whether their associated power supply inputs 110, 120 are operating within acceptable parameters. Each of power verification circuits 140, 150 also provides a path for power to flow from its respective power supply input 110, 120 to power supply input switching circuit 130.

It should be appreciated that, although input selection circuit 100 of FIG. 1 illustrates a single power verification circuit 140, 150 associated with a single power supply input 110, 120, any number or type of power supply inputs and associated power verification circuits in any combination may be used. It should also be appreciated that a single power verification circuit may be associated with a plurality of power supply inputs.

During initial startup of system circuit 101 and during a switch between power supply inputs 110, 120, power supply input selection circuit 100 performs a startup procedure, during which logic circuit 170 (which may include software, hardware, firmware, logic circuitry or any combination thereof) provides a reset signal to reset circuit 180. This inhibits power supply input switching circuit 130 from providing power to power output 135. The reset signal also causes reset circuit 180 to reset driven circuit 190 via line 155. This ensures that driven circuit 190 is not operating during startup, as well as ensuring that driven circuit 190 is restarted during transition from one power mode to another, such as a change from the default power mode to a desired power mode. In one variant of the present embodiment, logic circuit 170 provides the reset signal to reset circuit 180 in accordance with an external reset signal provided on reset input 175. This permits an operator to initiate a "hard" reset of system circuit 101 during certain modes of operation, such as, for example, during a testing mode of system circuit 101.

Logic circuit 170 may also provide an interrupt signal 185 to cause driven circuit 190 to cease operations while power supply input selection circuit 100 is started or while power supply inputs 110, 120 are changed or switched.

After the initial power-up sequence is completed, power supply input selection circuit 100 routes a default power supply input (i.e., either power supply input 110 or 120) to power output 135 for providing power to driven circuit 190. The default power supply input is selected in accordance with power supply selection information corresponding to a default power mode and stored in latch 160. Latch 160 controls power supply input switching circuit 130 as a function of the power supply selection information to route to power output 135 the default power supply input associated with the default power mode. If the default power mode matches a desired power mode, operation of driven circuit 190 proceeds normally.

If, however, the default power mode does not match the desired power mode, logic circuit 170 stores (i.e., overwrites) in latch 160 power supply selection information corresponding to the desired power mode and, hence, the desired one of power supply inputs 110, 120. The power supply input selection circuit 100 is then restarted with the newly written power supply selection information stored in latch 160 remaining intact. After the startup procedure completes for a second time, power supply input selection circuit 100 routes the desired power supply input (i.e., either power supply input 110 or 120) to power output 135 in accordance with the newly written power supply selection information stored in latch 160.

In one variant of the present embodiment, the power verification signal associated with the default/desired power supply input 110, 120 is checked by logic circuit 170 to determine whether the default/desired power supply input 110, 120 is available for use before routing the default/desired power supply input 110, 120 to power output 135. If the default/desired power supply input 110, 120 is not available or is otherwise not operational, another power supply input 110, 120 is selected for routing to power output 135.

Figure 2:
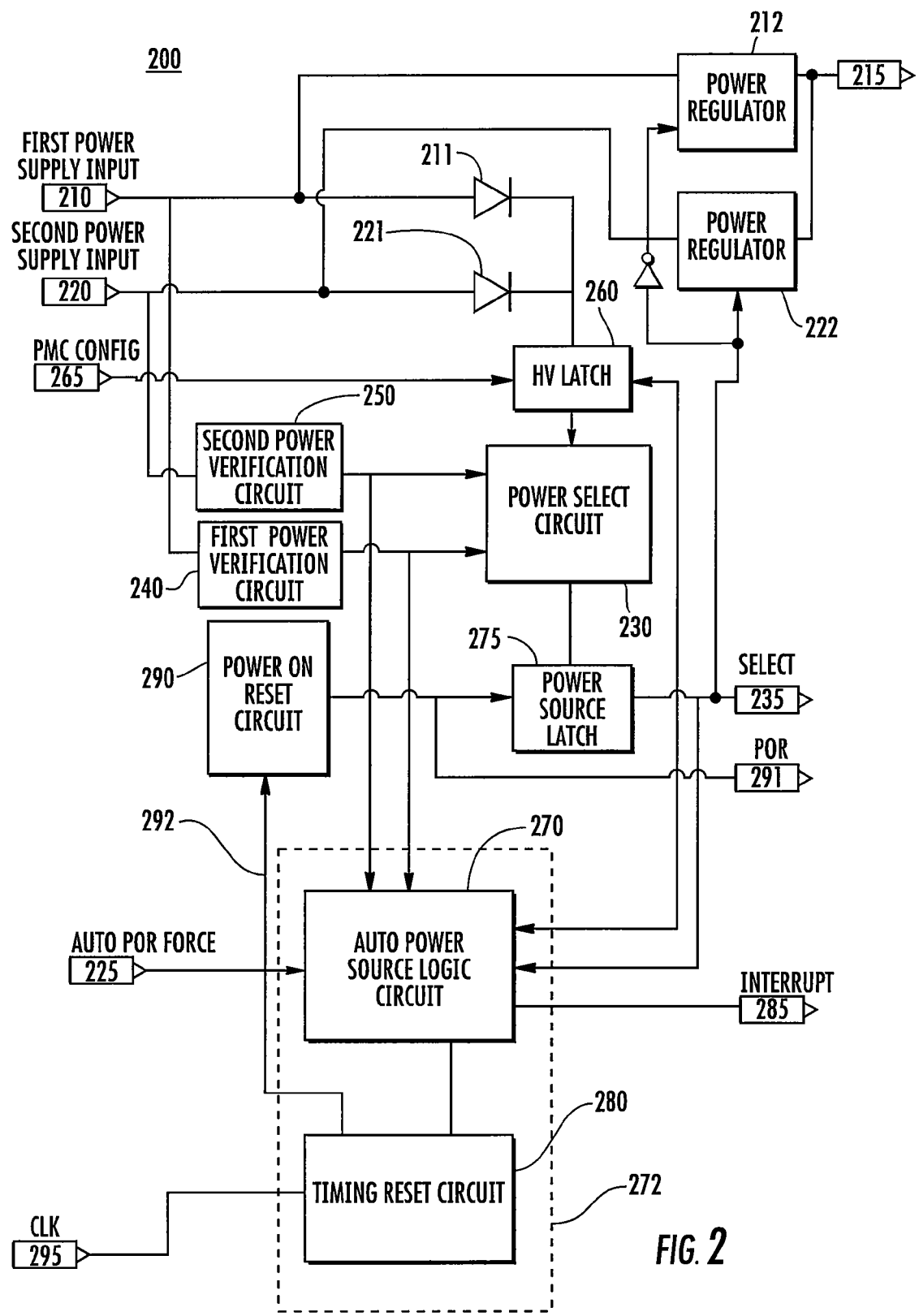
FIG. 2 is a block diagram of a power supply input selection circuit according to another embodiment of the present invention.

Referring now to FIG. 2, there is seen a block diagram of a power supply input selection circuit 200 according to another embodiment of the present invention. Power supply input selection circuit 200 is operable to route a selected one of first and second power supply inputs 210, 220 to power output 215 for powering driven circuit 190. In this embodiment, first power supply input 210 is a contactless power supply input and second power supply input 220 is a contact-type power supply input. It should be appreciated, however, that power supply inputs 210, 220 may include any combination of contactless and contact-type power supply inputs, and power supply input selection circuit 200 may be configured to route any number of power supply inputs to power output 215 for powering driven circuit 190.

During startup of power supply input selection circuit 200, system voltages used by circuit 200 rise over time to their operational, steady-state levels. Power-on-reset circuit 290 ensures that operating power is not provided to driven circuit 190 until power supply input selection circuit 200 fully powers up. For this purpose, power-on-reset circuit 290 initiates a power-on-reset sequence by outputting a power-on-reset (POR) signal 291. The POR signal 291 resets driven circuit 190 and inhibits power source latch 275 from providing a power supply select signal 235, which inhibits power to driven circuit 190 via power output 215 until system voltages reach their predetermined and operational levels (i.e., levels that ensure proper operation of power supply input selection circuit 200 and/or of driven circuit 190). Once the power-on-reset sequence completes, power-on-reset circuit 290 releases the power-on-reset signal 291 and enables power source latch 275 to route a selected one of power supply inputs 210, 220 to power output 215 via power regulator 212 or power regulator 222 based on select signal 235. In one variant of the present embodiment, the power-on-reset sequence may also be initiated manually using power-on-reset (POR) force signal 225.

Once power supply input selection circuit 200 fully powers up, a default power supply input (i.e., either of first and second power supply inputs 210, 220) is routed to power output 215 based on select signal 235 in accordance with power supply selection information stored in high voltage latch (HV latch) 260 and corresponding to a default power mode of operation. The power supply selection information may be stored in HV latch 260 by auto power source logic circuit 270 or, alternatively, via an external Power Management Circuit (PMC) input 265, for example, during a test mode or other desired mode of operation. The power supply selection information is used to control power select circuit 230 to connect the default power supply input to power output 215 via power source latch 275. Specifically, power supply select signal 235 functions as a selector signal to select one of power regulators 212, 222 to provide power to power output 215. In one variant of the present embodiment, auto power source logic circuit 270 can both read and write the power supply selection information from and to HV latch 260, respectively.

Similar to power verification circuits 140, 150 of FIG. 1b, first and second power verification circuits 240, 250 are operable to analyze one or more parameters of their associated power supply inputs 210, 220, such as stored charge, available current, supply voltage, and the like, to determine whether power supply inputs 210, 220 are available and operating within acceptable parameters. Each verification circuit 240, 250 provides a respective power verification signal to power select circuit 230 based on the analysis of these parameters. The power verification signal is then used by power select circuit 230 to determine whether a particular power supply input 210, 220 is available for routing to power output 215. In one embodiment, each of first and second power verification circuits 240, 250 also provides a path for power to flow from its respective power supply input 210, 220 to power select circuit 230.

If power supply input selection circuit 200 determines that the default power mode does not match a desired power mode, and if the power supply input 210, 220 designated by the desired power supply mode is available (as determined by first or second power verification circuit 240, 250), auto power source logic circuit 270 stores (i.e., overwrites) in HV latch 260 power supply selection information corresponding to the desired power mode and, hence, the desired one of power supply inputs 210, 220. The power supply input selection circuit 200 is then restarted with the newly written power supply selection information stored in HV latch 260, the power supply selection information being maintained during the restart. In one variant of the present embodiment, an interrupt signal 285 is provided to driven circuit 190 to interrupt any operations in driven circuit 190 before switching between power supply inputs 210, 220. After the startup procedure completes for a second time, power supply input selection circuit 200 routes the desired power supply input (i.e., one of power supply inputs 210, 120) to power output 215 in accordance with power supply select signal 235 based on the newly written power supply selection information stored in HV latch 160.

To restart power supply input selection circuit 200 in the desired power mode, a reset signal 292 is provided by timing reset circuit 280 to power-on-reset circuit 290 to reset power supply input selection circuit 200 in synchronization with system clock 295. This causes power-on-reset circuit 290 to output the power-on-reset signal 291 to reset driven circuit 190 and inhibit power source latch 275 from providing power to driven circuit 190 while power supply input selection circuit 200 switches between power supply inputs 210, 220. After power supply inputs 210, 220 are switched, the reset signal 292 is released, thereby releasing the power-on-reset signal 291 and enabling power source latch 275 to route the desired one of power supply inputs 210, 220 to power output 215 via one of power regulators 212, 222. Operation of power supply input selection circuit 200 in this manner ensures that driven circuit 190 is not operational while switching between power supply inputs 210, 220. In one variant of the present embodiment, auto power source logic 270 and timing reset circuit 280 are implemented as a single unit 272.

Figure 3:
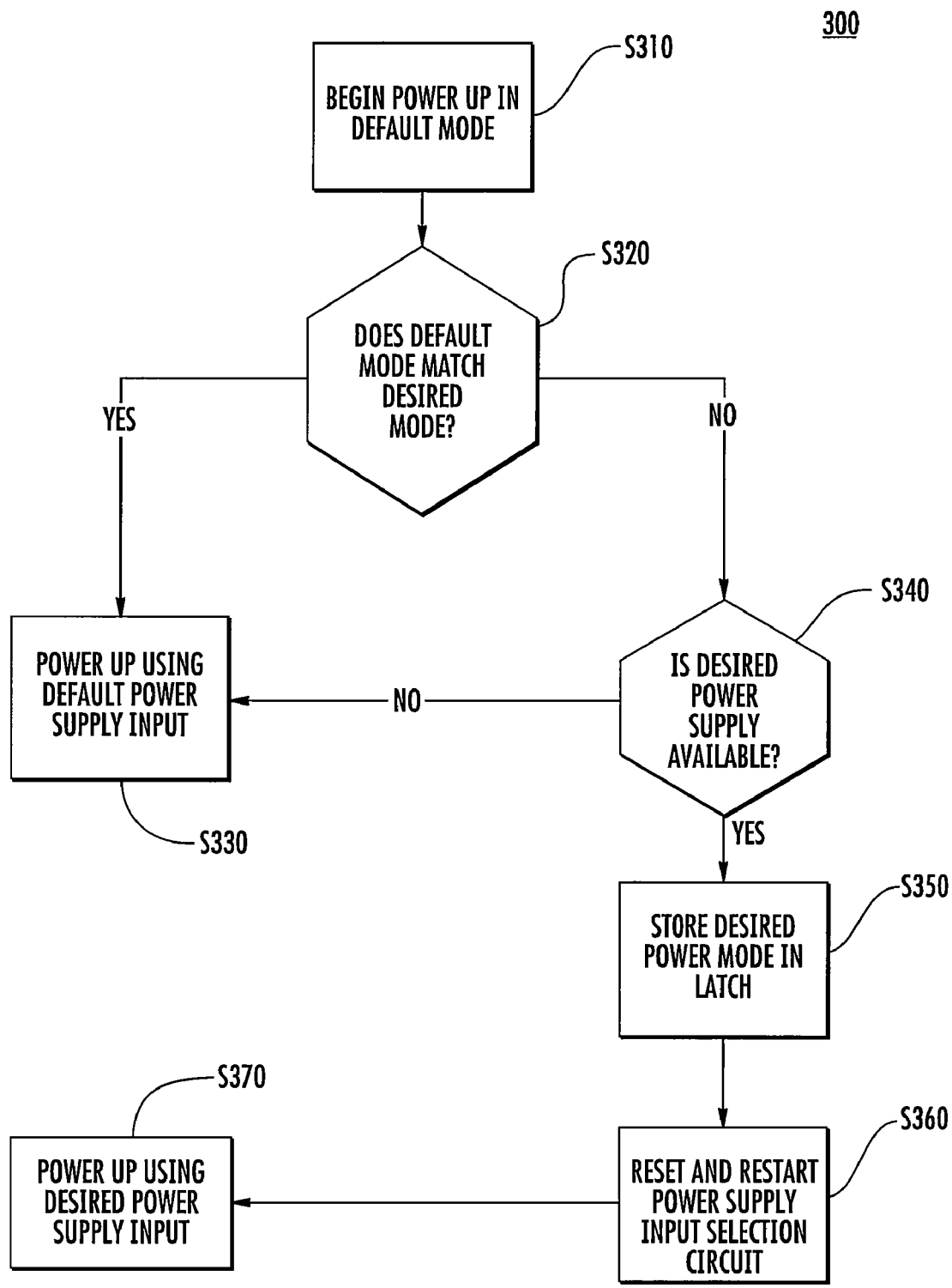
FIG. 3 is a flow chart illustrating a method of operating a power supply input selection circuit according to an embodiment of the present invention.

Referring now to FIG. 3, there is seen is a flowchart 300 illustrating a method of operating a power supply input selection circuit according to an embodiment of the present invention. The power supply input selection circuit begins power-up in a default power mode using a default power supply input (S310). Once the power supply input selection circuit has powered up, any driven circuits (i.e., driven circuit 190, which may include one or more integrated circuits) attached to the power supply input selection circuit are powered using the default power supply input. The power supply input selection circuit then determines whether the default power mode matches a desired power mode (S320). If the default power mode matches the desired power mode, the power supply input selection circuit completes power-up in the default power mode using the default power supply input (S330). If, however, the default power mode does not match the desired power mode, the power supply input selection circuit determines whether a desired power supply input corresponding to the desired power mode is available (S340). If the desired power supply input is not available, then power-up is completed in the default power mode using the default power supply input (S330). If the desired power supply input is available, power supply selection information identifying the desired power supply input and corresponding to the desired power mode is stored in a latch (S350). The power supply input selection circuit and any driven circuits powered by the power supply input selection circuit are then reset (S360). The power supply input selection circuit is then restarted in the desired power mode, after which the desired power supply input is selected in accordance with the newly written power supply selection information stored in the latch (S370). Power is then provided to the driven circuits using the desired power supply input.

By resetting the driven circuits before switching the power supply mode, power supply inputs are not switched while the driven circuits are in operation. As a result, the potential for voltage spikes in the driven circuits, and thus the potential for data loss or other damage, is significantly reduced.

By way of example, it is assumed that the power supply input selection circuit and at least one driven circuit is part of a device, such as a near field communication (NFC) device or radio frequency identification device (RFID), in which the default power mode corresponds to a mode in which a battery is used to power the device and the desired power mode corresponds to a mode in which a contactless supply is used to power the device. The power supply input selection circuit first powers up in the default battery mode (S310). The power supply input selection circuit then determines, for example, that the default battery mode does not match the desired contactless supply mode (S320), and the power supply input selection circuit determines that the desired contactless power supply is available (S340). Power supply selection information identifying the desired contactless power supply and corresponding to the desired contactless supply mode is stored in a latch (S350), and the driven circuit is reset with the newly written information remaining intact within the latch (S360). The driven circuit is then restarted using the desired contactless supply (S370).

Figure 4:
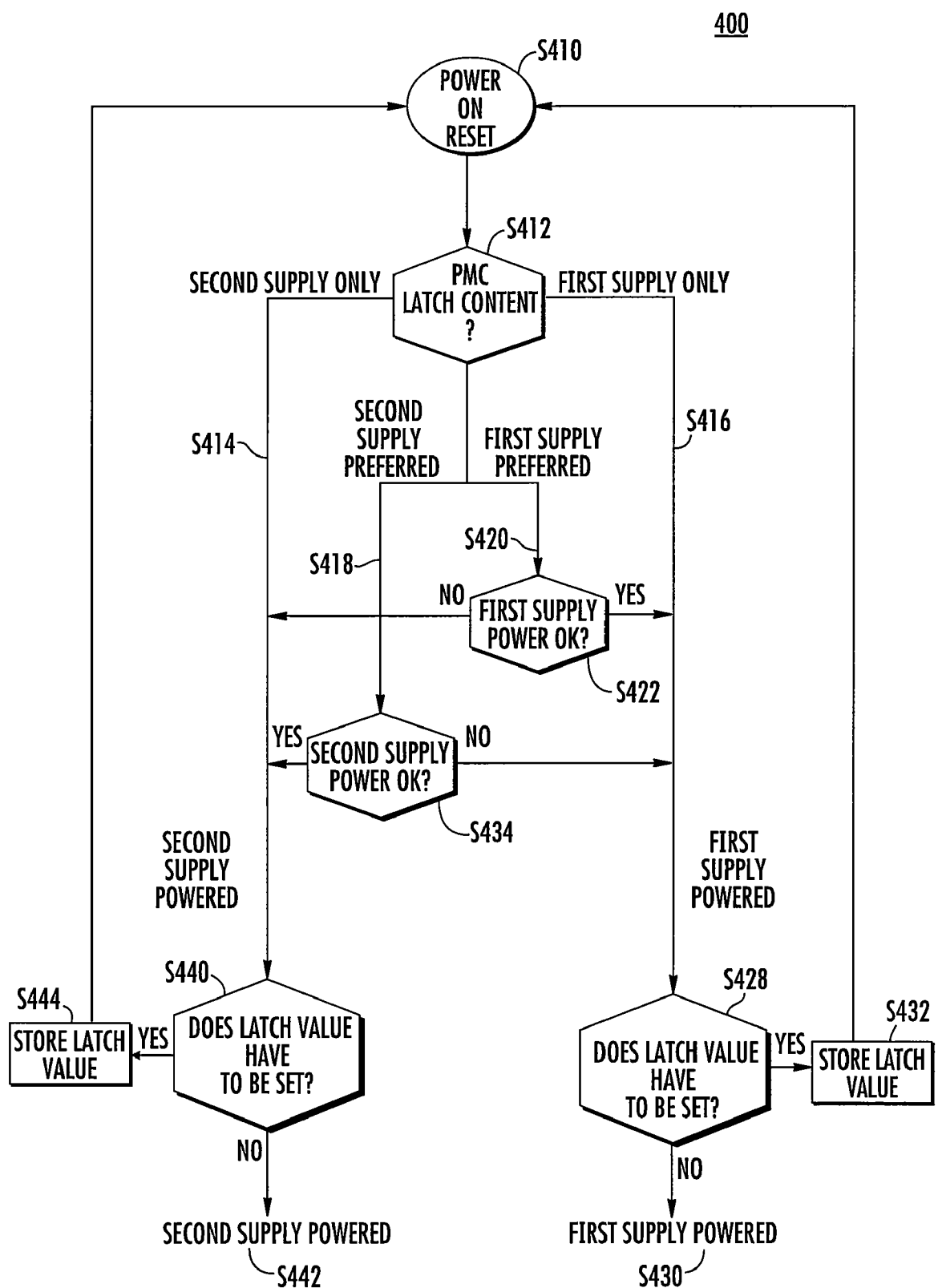
FIG. 4 is a flow chart illustrating a method of operating a power supply input selection circuit according to another embodiment of the present invention.

Referring now to FIG. 4, there is seen a flow chart 400 illustrating a method of operating a power supply input selection circuit according to another embodiment of the present invention. In accordance with the exemplary method, power supply input selection circuit may be operated in one of a plurality of power supply modes, such as, for example, a first supply only mode (S416), a second supply only mode (S414), a first supply preferred mode (S420), and second supply preferred mode (S418). In a variant of the present embodiment, a test mode may be used to determine whether the power supply input selection circuit is operating properly. It should be appreciated that the power supply input selection circuit may include any number of power supply modes.

The method begins with a power-on-reset of a power supply input selection circuit and any attached driven circuit (e.g., driven circuit 190, which may contain one or more integrated circuits) (S410). Next, the content of a power management circuit (PMC) latch is read (S412) to determine a default power supply mode. If the PMC latch is set for first supply preferred mode (S420), it is determined whether the first power supply input is available (S422). If the first power supply input is not available, power supply input selection circuit attempts power-up using the second power supply input (S414). If the first power supply input is available, power-up with the first supply occurs. It is then determined whether the PMC latch value has to be set (S428). The PMC latch value would need to be set to a different value if a preferred power mode did not match the default power mode (i.e., the first supply preferred mode), for example, if the preferred power mode were the second supply only or second supply preferred mode. In such a case, a latch value specifying the proper mode is stored in the PMC latch (S432), and the power supply selection circuit is then restarted using the preferred power supply input (S410). If the default power mode is the same as the preferred power mode, the latch value does not have to be set with a different value, and the system starts using the default power supply input (i.e., the first power supply input) (S430).

If the PMC latch is set for second supply preferred mode (S418), it is determined whether the second power supply input is available (S434). If the second power supply input is not available, power supply input selection circuit attempts power-up using the first power supply input (S416). If the second power supply input is available, power-up occurs using the second supply. It is then determined whether the PMC latch value has to be set (S440). The PMC latch value would need to be set to a different value if a preferred power mode did not match the default power mode (i.e., the second supply preferred mode), for example, if the preferred power mode were the first supply only or first supply preferred mode. In such a case, the latch value specifying the proper mode is stored in the PMC latch (S444), and the power supply selection circuit is then restarted (S410) using the preferred power supply input. If the default power mode is the same as the preferred power mode, the latch value does not have to be set with a different value, and the system starts using the default power supply input (i.e., the second power supply input) (S442).

First supply only mode (S416) and second supply only mode (S414) are modes typically used during testing. If either of these modes are selected, the power supply input selection circuit is forced to use only a single power supply to power the driven circuit. Specifically, if the second supply only mode (S414) is selected, the PMC latch is forced to a value selecting the second power supply input to power the driven circuit. If the first supply only mode (S416) is selected, the PMC latch is forced to a value selecting the first power supply input to power the driven circuit. In the first supply only mode (S416) and second supply only mode (S414), the power supply input selection circuit does not necessarily perform the power verification steps (S422 or S434). In situations where first power supply is unavailable, for example, the latch is preferably set for second supply only mode (S414). Likewise, in situations where second power supply is unavailable, the latch is preferably set for first supply only mode (S416).

The disclosed circuit and method can be used in such situations where multiple power supplies are available for powering a device. The disclosed circuit can also be used in power circuits for laptop computers, PDAs, cellular telephones, portable music players, and the like. For example, in many instances, a cellular telephone or RFID card can be used at point of sale kiosks to purchase various items. In these situations, the vendor does not want to be limited to situations where the devices must be self-powered or in a previously powered up mode. In those situations, the kiosk is able to power up the RFID card or cellular telephone so that an identification can be read from the RFID card or cellular telephone.

A cellular telephone, for example, would typically be set for a battery preferred power mode. If the cellular telephone's battery is depleted, the vendor and/or the user may still wish to make a purchase. In this scenario, and if a contactless power supply is available, the system latch would be set with power supply selection information for a contactless power supply input, and the cellular telephone would be restarted so that the integrated circuit can receive power from the contactless power supply and the sale can be completed.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A power supply input selection circuit for selecting one of a plurality of external power supply inputs to supply power to a driven circuit, comprising:
   a power supply input switching circuit configured to provide operating power to the driven circuit by routing a selected one of the external power supply inputs to the driven circuit as a function of external power supply selection information;
   a latch configured to be powered directly via any of the plurality of external power supply inputs and to store the external power supply selection information; and
   a logic circuit configured to change the external power supply selection information stored in the latch if a default power mode does not match a desired power mode, the logic circuit being further configured to reset the power supply input selection circuit after changing the external power supply selection information stored in the latch, the external power supply selection information stored in the latch being maintained during the reset,
   wherein the power supply input switching circuit provides a desired one of the external power supply inputs after the logic circuit resets the power supply input selection circuit.

2. The power supply input selection circuit according to claim 1, wherein the power supply input switching circuit is configured not to provide the operating power to the driven circuit while the logic circuit is resetting the power supply input selection circuit.

3. The power supply input selection circuit according to claim 1, wherein the logic circuit is further configured to reset the driven circuit after changing the external power supply selection information.

4. The power supply input selection circuit according to claim 3, wherein the driven circuit includes an integrated circuit, and the logic circuit is further configured to provide an interrupt signal to the integrated circuit to cause the integrated circuit to cease operations while the logic circuit resets the power supply input selection circuit.

5. The power supply input selection circuit according to claim 1, wherein the driven circuit resets after changing the external power supply selection information.

6. The power supply input selection circuit according to claim 3, wherein the power supply input switching circuit is configured not to provide the operating power to the driven circuit while the logic circuit is resetting at least one of the power supply input selection circuit and the driven circuit.

7. The power supply input selection circuit according to claim 1, wherein at least one of the external power supply inputs corresponds to one of a contact based power supply and a contactless based power supply.

8. The power supply input selection circuit according to claim 1, further comprising a plurality of power verification circuits respectively assigned to the plurality of external power supply inputs, each of the power verification circuits being configured to output a respective power verification signal as a function of an availability of the external power supply input with which it is associated, wherein the power supply input switching circuit routes the selected one of the external power supply inputs to the driven circuit as a function of at least one of the power verification signals output by the power verification circuits.

9. A system circuit, comprising:
a plurality of external power supply inputs;
a driven circuit; and
a power supply input selection circuit of claim 1 configured to select one of the plurality of external power supply inputs to supply power to the driven circuit.

10. A method of powering a circuit, comprising:
providing operating power to the circuit by routing a selected one of a plurality of external power supply inputs to the circuit as a function of external power supply selection information;
storing in a latch the external power supply selection information, wherein the latch is powered directly via any of the plurality of external power supply inputs;
changing the external power supply selection information stored in the latch if a default external power supply input does not match a desired external power supply input;
resetting the circuit after changing the external power supply selection information stored in the latch, the external power supply selection information stored in the latch being maintained during the reset; and
routing the desired external power supply input to the circuit as a function of the changed external power supply selection information after resetting the circuit.

11. The method according to claim 10, further comprising ceasing to provide operating power to the circuit before outputting a reset signal to cause the circuit to cease operation.

12. The method according to claim 10, wherein the circuit includes an integrated circuit, the method further comprising providing an interrupt signal to the integrated circuit to cause the integrated circuit to cease operations before routing the desired one of the plurality of external power supply inputs to the circuit.

13. The method according to claim 12, further comprising ceasing to provide operating power to the circuit before outputting the reset signal to cause the circuit to cease operation.

14. The method according to claim 10, wherein the content of the latch is set by a program.

15. The method according to claim 10, wherein at least one of the external power supply inputs corresponds to one of a contact based power supply and a contactless based power supply.

16. The method according to claim 10, further comprising verifying that the desired external power supply input is available for use before routing the desired external power supply input to the circuit.

17. A power supply input selection circuit for selecting one of a plurality of external power supply inputs to supply power to a driven circuit, comprising:
a power supply input switching means for providing operating power to the driven circuit by routing a selected one of the external power supply inputs to the driven circuit as a function of external power supply selection information;
a latching means, which is powered directly via any of the plurality of external power supply inputs, for storing the external power supply selection information; and
a logic means for changing the external power supply selection information stored in the latching means if a default power mode does not match a desired power mode, the logic means further for resetting the power supply input selection circuit after changing the external power supply selection information, the external power supply selection information stored in the latching means being maintained during the reset,
wherein the power supply input switching means provides a desired one of the external power supply inputs after the logic circuit resets the power supply input selection circuit.

18. A method of powering a circuit, comprising:
powering the circuit using a default external power supply input;
determining if the default external power supply input is a preferred external power supply input;
determining, if the default external power supply input is not a preferred external power supply input, if power from the preferred external power supply input is available;
storing, if power from the preferred external power supply input is available, in a latch a start up mode corresponding to the preferred external power supply input in a latch, wherein the latch is powered directly via any of the default external power supply input and the preferred external power supply input;
resetting operation of the circuit, while maintaining the stored start up mode in the latch;
reading the stored start up mode from the latch; and
powering the circuit using the preferred power supply input.

19. The method of powering an integrated circuit according to claim 18, further comprising, if the default external power supply input is the preferred power supply input, powering the circuit using the default power supply input.

20. The power supply input selection circuit according to claim 1, further comprising a power verification circuit assigned to at least one of the plurality of external power supply inputs, the power verification circuit being configured to output a power verification signal as a function of a detected availability of the at least one of the plurality of external power supply inputs with which it is associated, wherein the power supply input switching circuit routes the selected one of the external power supply inputs to the driven circuit as a function of the power verification signal output by the power verification circuits.

21. The method according to claim 10, further comprising verifying that the selected one of the plurality of external power supply inputs is available for use before routing the selected one of a plurality of external power supply inputs to the circuit.

* * * * *